US006029379A

United States Patent [19]

Brandolini et al.

[11] Patent Number: 6,029,379

[45] Date of Patent: Feb. 29, 2000

[54] THERMOSTAT CONTROL DEVICE WITH RACK AND PINION

[75] Inventors: Jean-Louis Brandolini, Saint-Etienne; Stephane Garda, Jardin, both of France

[73] Assignee: SEB S.A., Ecully, France

[21] Appl. No.: 09/230,520

[22] PCT Filed: Jun. 3, 1998

[86] PCT No.: PCT/FR98/01122

§ 371 Date: Jan. 27, 1999

§ 102(e) Date: Jan. 27, 1999

[87] PCT Pub. No.: WO98/56022

PCT Pub. Date: Dec. 10, 1998

[30] Foreign Application Priority Data

Jun. 5, 1997 [FR] France .................................. 97-07201

[51] Int. Cl.[7] ............................ D06F 75/24; F16H 19/04

[52] U.S. Cl. ................................................ 38/77.7; 74/30

[58] Field of Search ................................ 38/77.7, 77.83, 38/77.8, 77.3; 219/250, 251, 252; 74/29, 30, 422

[56] References Cited

U.S. PATENT DOCUMENTS

| | | | |
|---|---|---|---|
| 2,642,027 | 6/1953 | Kircher | 38/77.7 X |
| 2,976,627 | 3/1961 | Kistner et al. | 38/77.7 |
| 3,224,122 | 12/1965 | Jepson et al. | 38/77.7 X |
| 4,516,663 | 5/1985 | D'Alessio et al. | 74/422 X |
| 4,748,755 | 6/1988 | Bain, Jr. . | |
| 5,170,577 | 12/1992 | Brandolini et al. | 38/77.8 |
| 5,195,078 | 3/1993 | Ikedo et al. | 74/422 X |

FOREIGN PATENT DOCUMENTS 086 759 9/1983 European Pat. Off. .

*Primary Examiner*—Ismael Izaguirre
*Attorney, Agent, or Firm*—Pillsbury Madison & Sutro

[57] ABSTRACT

A thermostat control device (10), in particular an electric iron thermostat (7), comprising a support (11), an aperture (12) in said support for receiving a mobile control device (13) a first device forming a rack (14) co-operating with said control device, a guide device (19) for said rack and a gear wheel (16) cooperating with the first rack. The invention is characterized in that a second rack (150) is used provided in the extension of said first rack a gear wheel (16) comprising two toothed zones with respectively different primary circle radii, the first toothed zone (17) cooperating with the first rack (14) and the second toothed zone (18) cooperating with the second rack (16), said gear wheel being capable of driving in rotation said thermostat (7) rod (8).

8 Claims, 5 Drawing Sheets

THERMOSTAT CONTROL DEVICE WITH RACK AND PINION

This application is the national phase of international application PCT/FR97/07201 filed Jun. 3, 1998 which designated the U.S.

BACKGROUND OF THE INVENTION

The present invention relates to the field of household electric appliances in general and it is applied more particularly (but not exclusively) to pressing irons.

It concerns more precisely a thermostat control device, particularly a pressing iron thermostat, and permits, for a given path of the control means, to obtain a more precise temperature regulation and above all in the zone of the most desired temperatures.

The device according to the invention is more particularly intended to assure a precise temperature regulation function. As such, the thermostat control device according to the invention concerns more specifically, but not exclusively, pressing appliances, such as pressing irons for example.

Temperature control of pressing irons is performed by a bimetal thermostat whose operation is effected directly by a rotary button or indirectly by a device of the rack and pinion type and a linear slider. In the two cases, the temperature selection range comprises one part for heating and another intended for adjustment for the different types of fabrics utilized.

The rack and pinion system permits one to have a reduction between the slider and the thermostat to increase the precision of the adjustment. A pressing iron must have a temperature selection range going from the maximum (220°) to the shutting off of power at ambient temperature. In the context of a pressing iron using a device of the rack and pinion type to assure control of the thermostat, the path corresponding to the temperature selection phase constitutes only around one-half of the control range of said thermostat. The rest of the path of the control means corresponds to the heating phase, that is from the switching off of current to the first operating temperature of the iron.

The drawback of such a device is that around one-half of the path of the control means is not usable for selecting temperatures to be used during ironing. There thus remains less space usable to effectuate a precise adjustment in the range of operating temperatures of the iron.

BRIEF SUMMARY OF THE INVENTION

The invention has precisely for its goal to overcome this drawback, and proposes a control device for a thermostat, notably a thermostat of a pressing iron, which permits, for a given path of the control means, to obtain a more precise temperature adjustment and a longer path in the range of the most desired temperatures.

In order to attain this goal there is provided a control device for a thermostat, notably a thermostat of a pressing iron, comprising a support, an opening in said support to receive a mobile control means, a first rack forming means cooperating with said control means, guide means for said rack forming means, a pinion cooperating with the first rack forming means, characterized in that it comprises a second rack forming means disposed in the extension of said first rack forming means and that said pinion comprises two toothed zones whose respective root circle radii are different, the first toothed zone cooperating with the first rack forming means and the second toothed zone cooperating with the second rack forming means, said pinion being capable of rotating the shaft of said thermostat.

The thermostat control device according to the invention permits, for the same path of the mobile control means, to have a long adjustment path to the detriment of the approach path which becomes very small. This permits a precise adjustment for a larger range of adjustment temperatures. In addition, it is no longer necessary to displace the slider over a large range before arriving at the first operating temperature.

Another advantage connected with the utilization of a thermostat control device according to the invention is a better selection of a precise temperature corresponding to a given type of fabric.

Moreover, given the fact that the temperature adjustment range is larger, selection can be made for a larger number of temperatures and one thus obtains a large number of possibilities for corresponding fabrics to be chosen. This permits the pressing iron to cover a greater diversity of fabric types.

According to an advantageous variant of the invention, the constituent parts of the thermostat control device are fixed to the support which is secured on the frame of the pressing iron. This permits having a universal support which can be adapted to several types of pressing irons that already exist. The construction described permits use of the part comprising adjustment elements, for example the existing plate, without supplemental modifications. Moreover, there is obtained a control device assembly which is compact and which occupies very little space in the frame of the iron. Mention can also be made of the fact that such a variant implies substantial construction and assembly facilities and, consequently, a reduction in the costs of fabrication.

BRIEF DESCRIPTION OF THE SEVERAL VIEWS OF THE DRAWING

Other characteristics and advantages of the invention will appear more clearly in light of the description and the drawings which follow, illustrating, by way of non-limiting examples, embodiments of the invention. Thus, reference is made to FIGS. 1 to 5, where.

DETAILED DESCRIPTION OF THE INVENTION

Figure 1:
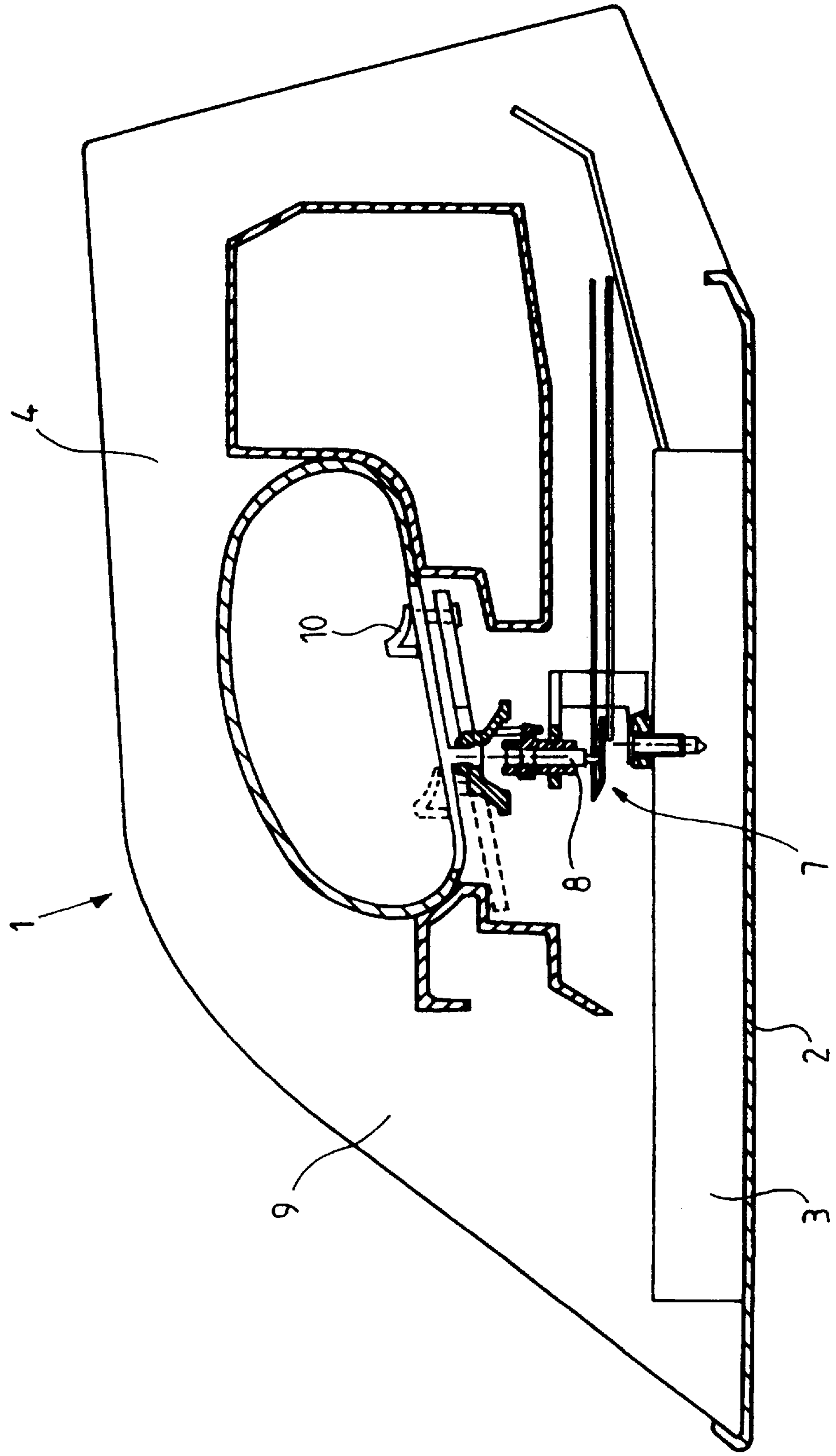
FIG. 1 represents an elevational cross-sectional view of a pressing iron comprising a thermostat control device according to the invention.

FIG. 1 illustrates a pressing iron 1 comprising, in a manner known per se, a sole plate 2 heated by means of a heating body 3, a steam chamber situated above the sole plate, a device for supplying water to the steam chamber and a means for adjusting said device. The iron also comprises a thermostat 7, for example of the bimetal type, to adjust the heating temperature of sole plate 2, and electric connections connecting the power mains to the body for heating the sole plate. The various adjustment elements are advantageously provided on a plate 6 disposed above the steam chamber. These different elements are disposed in a frame, or shell, 9 forming in its upper part a holding means 4 facilitating handling of the iron.

The iron according to the invention comprises a thermostat control device 10 permitting thermostat 7 to be acted on in an optimal manner. A shaft 8 of the thermostat, disposed between this latter and said thermostat control device, provides a mechanical connection between these elements.

Figure 2:
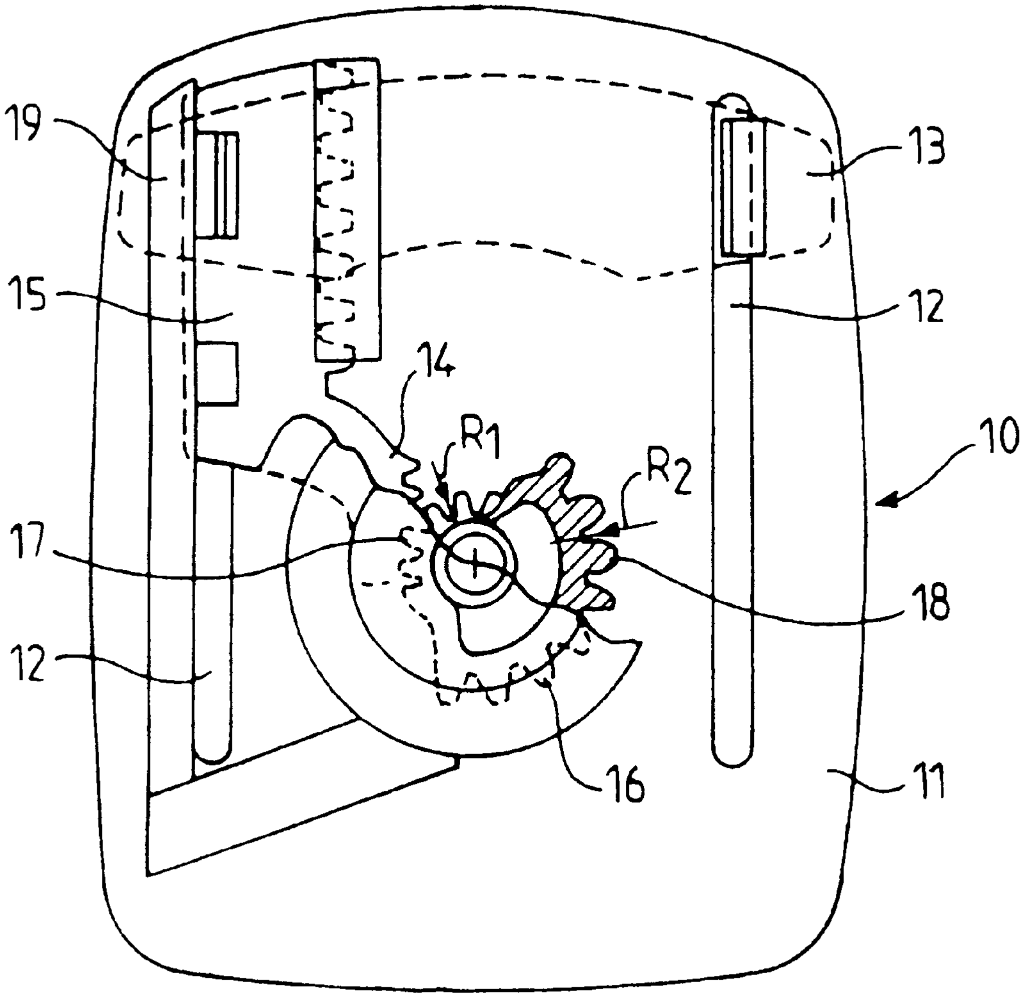
FIG. 2 represents a bottom view of the thermostat control device according to the invention.

The different elements of the thermostat control device are better seen in FIG. 2. This figure illustrates a preferred example of an embodiment of the thermostat control device according to the invention.

A support 11 presents two apertures 12 permitting connection between a mobile control means 13 disposed at the external side of support 11 and a rack assembly disposed at the internal side of said support. Said rack assembly is provided to engage a pinion 16 which acts on shaft 8 of thermostat 7. This rack assembly comprises a first rack means 14 and a second rack means 15 in the extension of the first. Pinion 16 comprises a first toothed zone 17 on a first sector of its circumference. It also comprises a second toothed zone 18 on a second sector of the circumference juxtaposed to the first.

The radius R1 of the root circle of first toothed zone 17 is less than the radius R2 of the root circle of second toothed zone 18. First rack means 14 is provided to cooperate with first toothed zone 17 and second rack means 15 is provided to cooperate with second toothed zone 18 of pinion 16.

In a rack and pinion system the ratio between the movement of the rack and the angle of rotation of the pinion is governed by the equation $A=C*180/(\pi*R)$ where A is the angle of rotation of the pinion, C is the travel of the rack and R is the radius of the root circle. One thus observes that the angle of rotation of the pinion is inversely proportional to the radius of the root circle. On this idea is based the operation of the thermostat control device according to the invention. In the context of adjustment of a thermostat for a pressing iron one distinguishes two temperature ranges: a heating range corresponding what is called an approach path of the control means and a second range, called of selection of temperature to be utilized during pressing. By adding the two paths corresponding to the two ranges mentioned, one obtains the total path of the control means. The thermostat control device according to the invention proposes to reduce the approach path for the purpose of utilizing with greater efficiency the remainder of the path of the control means corresponding to the zone of temperature selection or adjustment. For this purpose, in the approach phase, first rack forming means 14 rotates first toothed zone 17 of the pinion. The radius of root circle R1 is small thus the rotation, in accordance with the preceding equation, is substantial. One thus obtains a short approach path for the start up and initial heating of the iron (short path for a substantial temperature variation).

In the adjustment phase, second rack forming means 15 in turn drives second toothed zone 18 of the pinion in rotation. The radius of root circle R2 is substantial thus the angle of rotation of the pinion is small. One obtains this time a long path and a large range for selection of the temperatures to utilize in the course of pressing (long path for a limited increase in temperature).

Pinion 16 is mounted on shaft 8 of thermostat 7 and thus the rotational movement of said pinion drives in rotation the shaft of said thermostat which acts in its turn on the bimetal to modify the temperature for opening the contacts between the heating element and the current supply source. In the embodiment shown in FIG. 2, it is observed that the rack and pinion assembly is guided in its displacement with respect to the support 11 by a guide means 19. Said guide means is fixed to support 11 and it is in the form of a rail to permit the sliding of the means forming the rack and pinion assembly.

In a first advantageous modified embodiment of the invention, support 11 and the elements connected thereto are made of molded plastic to facilitate fabrication, reduce weight and equally reduce fabrication costs.

In FIG. 2, it is observed that mobile control means 13 comprises a support means on apertures 12. This support means also serves as a means for mechanical connection between mobile control means 13 and the rack and pinion assembly.

According to an advantageous variant of the invention, support 11 and the elements connected thereto are of molded plastic material to facilitate industrialization, reduce the weight and reduce, also, the fabrication costs.

The rack and pinion assembly can present, in a manner know per se, on the face opposed to that of the engagement with the pinion and along its entire length, a notched portion. This notched portion cooperates with an elastic tongue fixed to support 11. Such an arrangement confers on mobile control means 13 a pawl positioning effect having as its result a more precise positioning along the entire length of the path of said control means.

Figure 5:
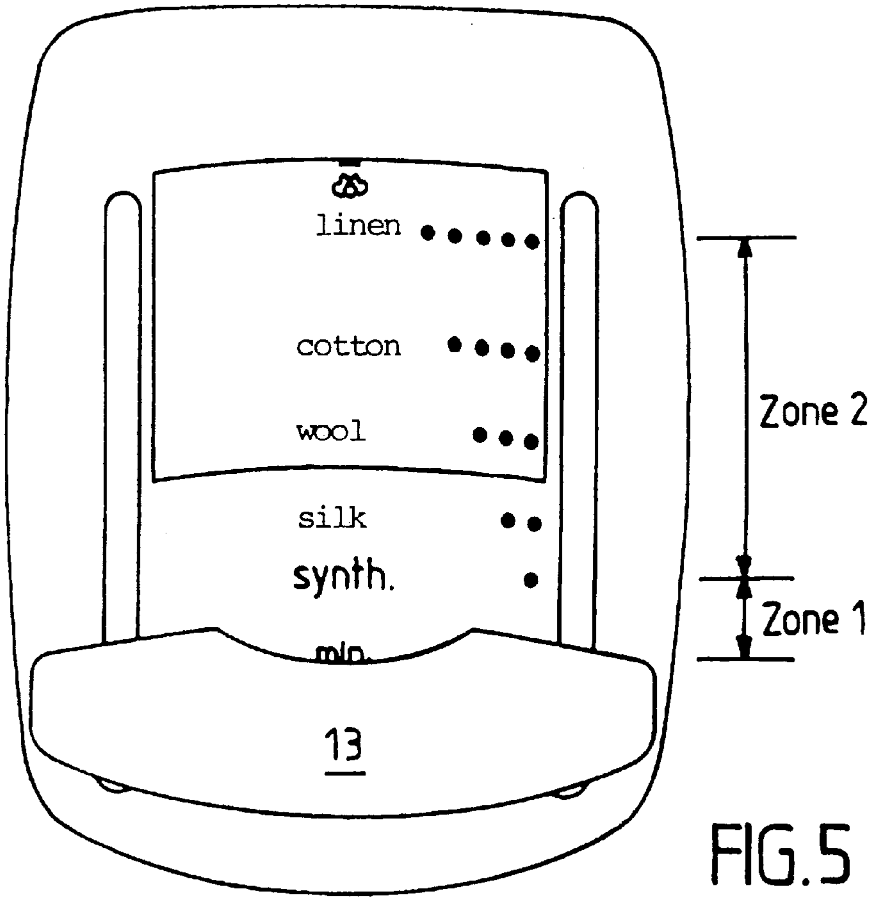
FIG. 5 represents a top view of the device according to the invention showing an example of a scale for indicating the type of fabric corresponding to a given temperature.

Said control means comprises graduations corresponding to the different types of fabrics utilized. It is seen moreover in FIG. 5 that the path of mobile control means 13 is virtually divided into two temperature zones: zone 1 corresponding to the approach zone and zone 2 to the adjustment zone, the first being much more reduced than the second.

In the example represented in FIG. 2, the different elements of the thermostat control device according to the invention are part of support 11.

Figure 3A:
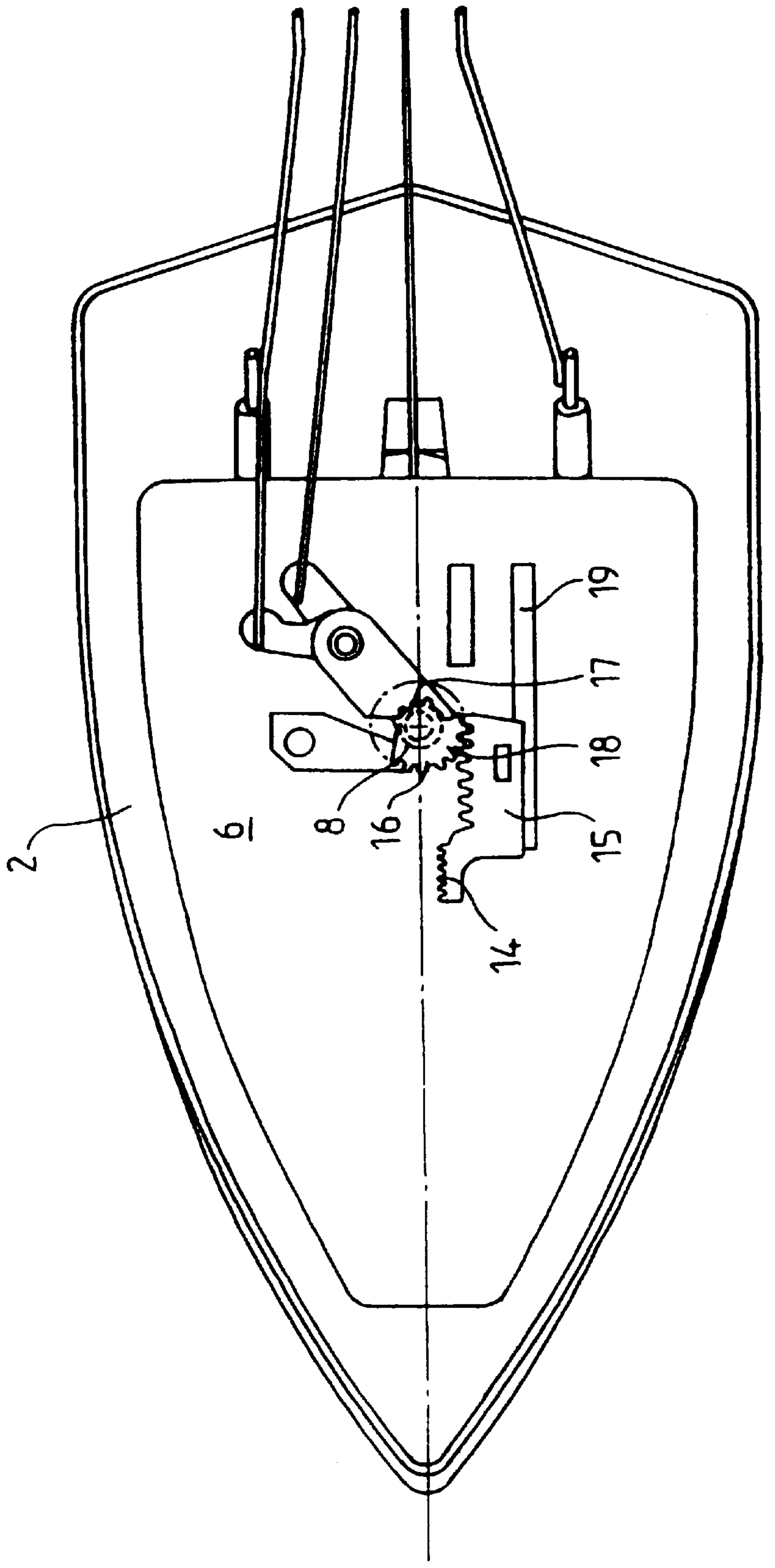
FIGS. 3*a* and 3*b* represent top and side views of the plate of a pressing iron comprising a thermostat control device according to the invention.
Figure 3B:
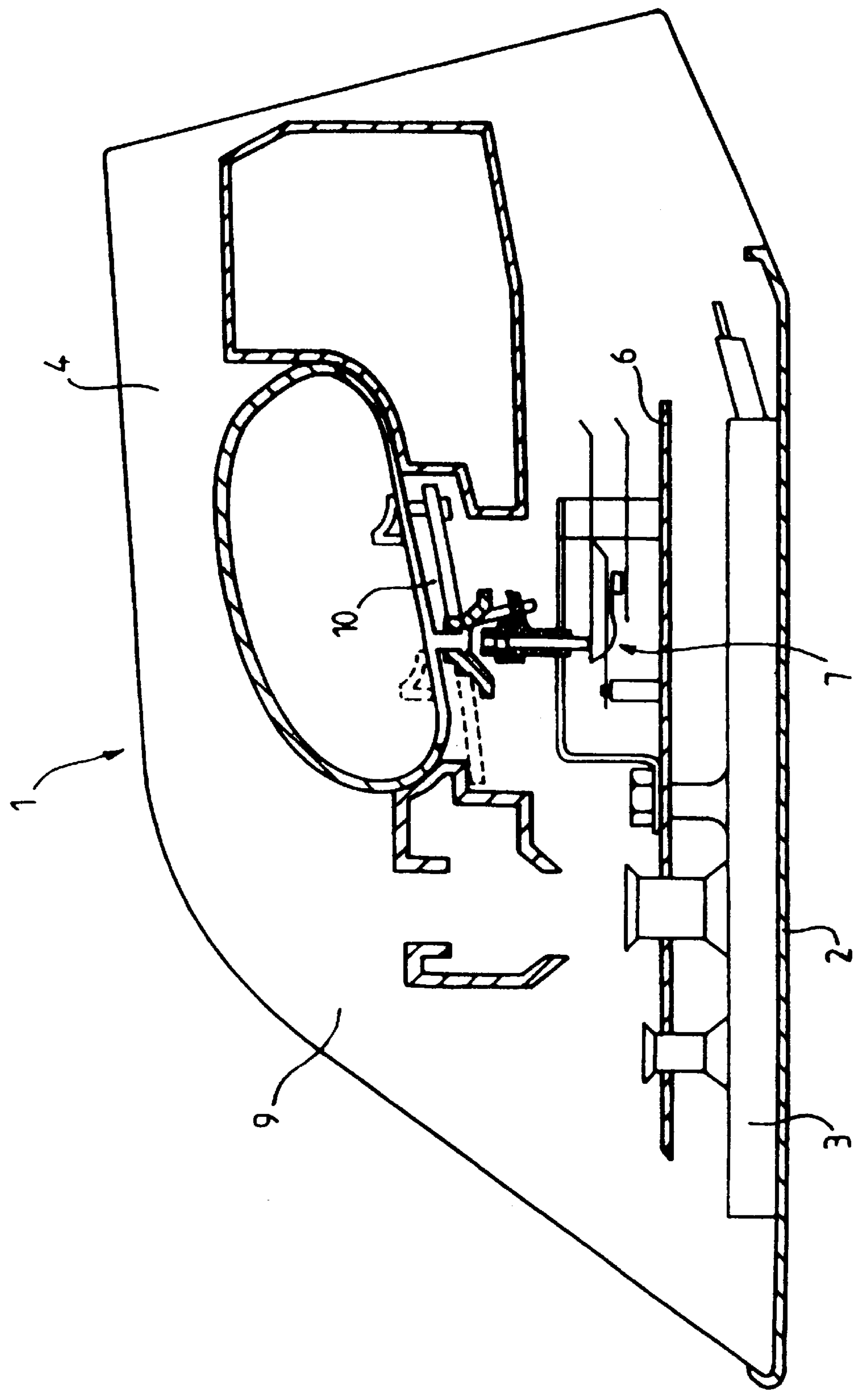

Conforming to an advantageous variant of the invention, the different elements of said control device are fixed to plate 6 of pressing iron 1. Said plate is situated above the steam chamber of the iron and substantially parallel to the sole plate. It forms, a manner to per se, a support for the components for supplying water to the steam chamber, for the temperature adjustment means and for the electrical connections of said iron. Such a plate can be produced separately and equipped with all of the control organs on a common support, which then facilitates the assembly in the iron. Its placement in a position substantially parallel to the sole plate permits displacement in a horizontal direction of the rack forming means without increasing the space occupied. The plate is made of an insulating plastic material and it comprises on the face opposite to the sole plate conductive metalized lines whose extremities are intended to be connected to the power cord of the iron. FIGS. 3*a* and 3*b* illustrate this embodiment.

Figure 4:
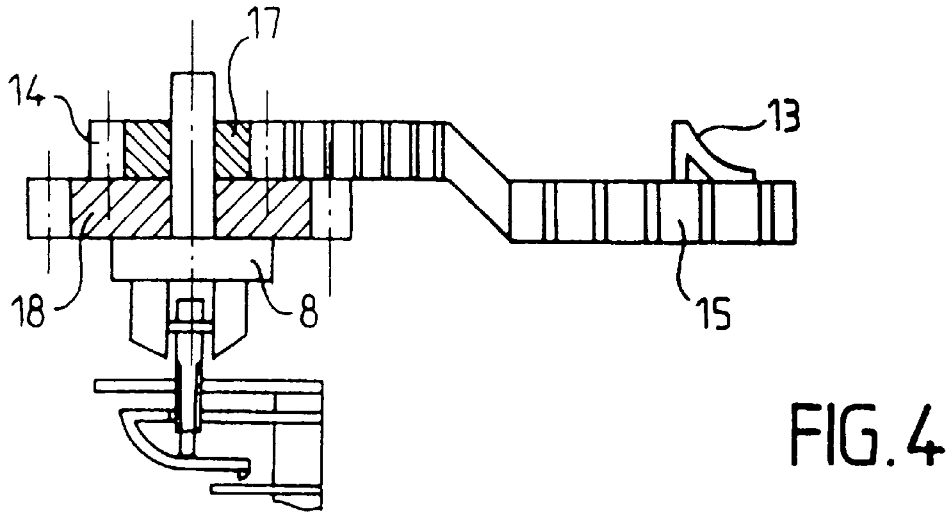
FIG. 4 represents a schematic cross-sectional view of a thermostat control device according to the another embodiment of the invention.

According to the another advantageous theory of the invention and which is illustrated in FIG. 4, the two toothed zones of racks 14 and 15 are found in two different parallel planes. In this case, pinion 16 has two toothed sectors or two toothed wheels 17 and 18 situated also in two different parallel planes to cooperate with the two above-cited toothed zones of racks 14 and 15.

POSSIBILITIES OF INDUSTRIAL APPLICATION

The invention finds its application in the technical field of household electric appliances.

We claim:

1. A control device for a thermostat, the thermostat having a movable element that is movable over a first path corresponding to a temperature range, said control device comprising: a mobile control member movable over a second path associated with the temperature range; and a rack and pinion assembly coupled between said mobile control member and the movable element of the thermostat, wherein said rack and pinion assembly is constructed to move the movable element in response to movement of said movable control member such that a ratio exists between displacement of said mobile control member over the second path and movement of the movable element of the thermostat over the first path, and the ratio has a first value associated with a first portion of each path and a second value, different from the first value, associated with a second portion of each path.

2. The control device according to claim 1 wherein said rack and pinion assembly comprises: a pinion having first and second zones provided with teeth on respective root circles having respectively different radii; and a rack having first and second zones each cooperating with, and having teeth that engage with the teeth of, a respective one of said first and second zones of said pinion.

3. The control device according to claim 2 wherein said second zones of said rack and said pinion cooperate to move the thermostat element over a first temperature range portion for ironing a variety of fabrics, and said first zones of said rack and said pinion cooperate to move the thermostat over a second temperature range portion covering temperatures lower than the first temperature range portion.

4. The control device according to claim 2 wherein said first and second zones of said rack and of said pinion are located in two different mutually parallel planes.

5. The control device according to claim 1 wherein said movable element, said mobile control member and said rack and pinion assembly are secured to a support plate.

6. A pressing iron comprising: a control device according to claim 1; a frame; a soleplate; and a support plate carrying said movable element, said mobile control member and said rack and pinion assembly so that said mobile control member is in a location that is easily accessible to a user during pressing.

7. The pressing iron according to claim 6 further comprising a handle carried by said frame and wherein said mobile control member is located under said handle.

8. The pressing iron according to claim 7 further comprising a scale associated with said mobile control member and provided with graduations corresponding to different types of fabrics to be ironed.

* * * * *